United States Patent
Mitev

(10) Patent No.: US 12,204,358 B2
(45) Date of Patent: Jan. 21, 2025

(54) POWER CONVERTER WITH BYPASS FUNCTION

(71) Applicant: Dialog Semiconductor (UK) Limited, London (GB)

(72) Inventor: Mityu Mitev, Munich (DE)

(73) Assignee: Renesas Design (UK) Limited, Bourne End (GB)

( * ) Notice: Subject to any disclaimer, the term of this patent is extended or adjusted under 35 U.S.C. 154(b) by 816 days.

(21) Appl. No.: 17/379,490

(22) Filed: Jul. 19, 2021

(65) Prior Publication Data

US 2022/0181971 A1 Jun. 9, 2022

(30) Foreign Application Priority Data

Dec. 8, 2020 (DE) .......................... 102020215489.9

(51) Int. Cl.
| G05F 1/00 | (2006.01) |
| G05F 1/563 | (2006.01) |
| G05F 1/575 | (2006.01) |
| G05F 1/59 | (2006.01) |

(52) U.S. Cl.
CPC ................ *G05F 1/59* (2013.01); *G05F 1/563* (2013.01); *G05F 1/575* (2013.01)

(58) Field of Classification Search
CPC ............ G05F 1/59; G05F 1/563; G05F 1/575; H02M 1/0045
See application file for complete search history.

(56) References Cited

U.S. PATENT DOCUMENTS

| 6,919,755 B2 | 7/2005 | Egerer et al. |
| 7,765,418 B2 | 7/2010 | Mann et al. |
| 10,530,249 B1* | 1/2020 | Lee .......................... H02M 1/08 |
| 2013/0193941 A1* | 8/2013 | DeFazio ................... G05F 1/46 |
| | | 323/282 |

FOREIGN PATENT DOCUMENTS

| DE | 102 27 335 A1 | 1/2004 |
| DE | 10 2008 13 758 A1 | 10/2008 |
| JP | 60257766 A | 12/1985 |
| JP | 63231514 A | 9/1988 |
| JP | 01270118 A | 10/1989 |
| JP | 02041512 A | 2/1990 |
| JP | 2012185709 A | 9/2012 |

OTHER PUBLICATIONS

German Office Action, File No. 10 2020 215 489.9, Applicant: Dialog Semiconductor (UK) Limited, Mail date: Jul. 16, 2021, 8 pages.

* cited by examiner

*Primary Examiner* — Jue Zhang
*Assistant Examiner* — Afework S Demisse
(74) *Attorney, Agent, or Firm* — Saile Ackerman LLC; Stephen B. Ackerman

(57) ABSTRACT

The present document relates to a power converter. The power converter may be configured to convert an input voltage at the input of the power converter into an output voltage at an output of the power converter. The power converter may comprise a pass device, a feedback circuit, and a bypass circuit. The pass device may be coupled between the input of the power converter and the output of the power converter. The feedback circuit may be configured to generate, in a voltage regulation mode, a drive signal for driving a control terminal of the pass device. The bypass circuit may be configured to apply, in a bypass mode, a (Continued)

if $V_{IN} < V_{IN\_th}$ : ByPass is ON and LDO is OFF and vice versa
if $V_{IN} > V_{IN\_th}$ : LDO is ON and ByPass is OFF predetermined voltage to the control terminal of the pass device.

18 Claims, 2 Drawing Sheets

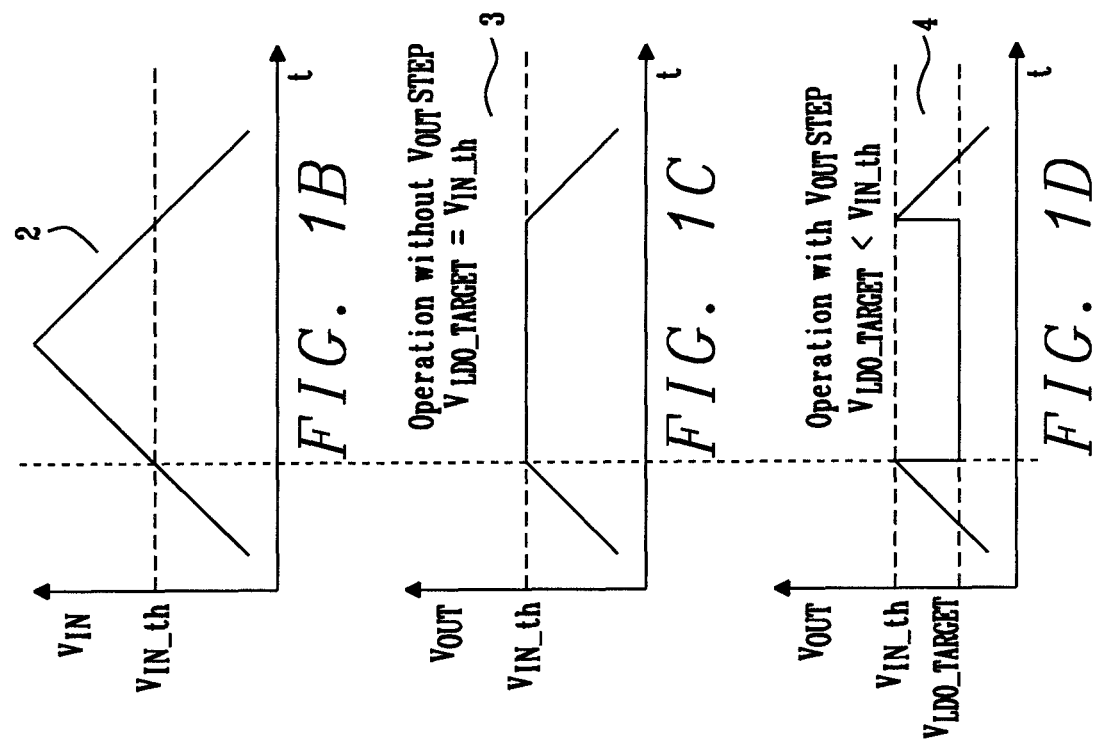
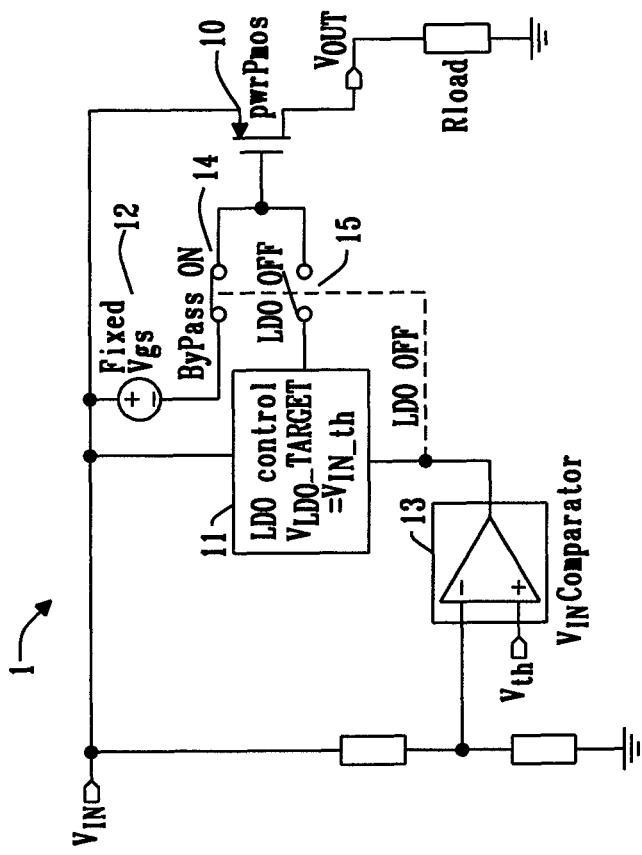

POWER CONVERTER WITH BYPASS FUNCTION

TECHNICAL FIELD

The present document relates to DC (Direct Current)/DC converters. In particular, the present document relates to low-dropout (LDO) regulators in application scenarios where an input voltage is close to or even lower than the desired output voltage.

BACKGROUND

Many linear regulators in metal-oxide semiconductor (MOS) technology use p-type or n-type metal-oxide-semiconductor field effect transistors (MOSFETs) as power devices to create a controlled voltage drop from a varying power source in order to provide stable output voltage. Such power devices are relatively big and need a dedicated feedback circuit for their control. Feedback circuits typically comprise an error amplifier and a buffer. In most application scenarios, the input voltage of the linear regulator is larger than the desired output voltage. If, however, the input voltage approaches the desired output voltage, the linear regulator operates in drop-out and the current consumption of commonly used buffers increases significantly. It may even happen that in drop-out the current consumption of the buffer substantially exceeds the current delivered to the output of the linear regulator. In other words, linear regulators may become very inefficient in these application scenarios.

SUMMARY

The present document addresses the above-mentioned technical problems. In particular, the present document addresses the technical problem of providing a power converter with increased power efficiency which, at the same time, automatically limits the output voltage to a safe level.

According to an aspect, a power converter is presented. The power converter may be a linear voltage regulator such as e.g. a low-dropout (LDO) regulator. The power converter may be configured to convert an input voltage at the input of the power converter into an output voltage at an output of the power converter. The power converter may comprise a pass device, a feedback circuit, and a bypass circuit. The pass device may be coupled between the input of the power converter and the output of the power converter. The feedback circuit may be configured to generate, in a voltage regulation mode, a drive signal for driving a control terminal of the pass device. The bypass circuit may be configured to apply, in a bypass mode, a predetermined voltage to the control terminal of the pass device.

The pass device may be implemented e.g. using a p-type or n-type metal-oxide-semiconductor field effect transistor (MOSFET). As already mentioned, the pass device may have a control terminal to which a respective drive or control signal may be applied to control current flow between the input and the output of the power converter. On the one hand, the control signal may be applied to the pass device such that the pass device is (completely) turned on (i.e. closed) or (completely) turned off (i.e. opened) like a switching element. On the other hand, the control signal may be applied to the pass device such that the pass device behaves as a voltage controlled current source (VCCS) for regulating the output voltage of the power converter. In this regard, the pass device may be a MOSFET operated in linear mode operation (sometimes also denoted as current saturation region) wherein the drain-source current directly depends on the gate-source voltage of the MOSFET.

In particular, the pass device may be a p-type MOSFET which is common source connected, i.e. the source of the pass device may be connected to the input of the power converter, the drain of the pass device may be connected to the output of the power converter, and the gate of the pass device may represent the control terminal of the pass device.

The power converter may comprise a comparator circuit for comparing a voltage indicative of the input voltage with a threshold voltage. The power converter may be configured to select between the bypass mode and the voltage regulation mode based on the result of the comparison.

The input voltage may be an analog, continuous signal. The voltage indicative of the input voltage may be e.g. a voltage which is derived from the input voltage using a voltage divider with a given division ratio. The threshold voltage may be a fixed, predetermined voltage value. The comparator circuit may be configured to generate a binary result signal indicating which of the two input signals has a larger signal value. For example, a high value of the binary result signal may indicate that the voltage indicative of the input voltage has a larger signal value, and a low value of the binary result signal may indicate that the threshold voltage has a larger signal value, or vice versa. The comparator circuit may or may not have a hysteresis to prevent the power converter from oscillating between the bypass mode and the voltage regulation mode.

The power converter may be configured to switch to the bypass mode if the input voltage falls below a threshold input voltage. The power converter may be configured to switch to the voltage regulation mode if the input voltage exceeds the threshold input voltage.

The threshold input voltage may be associated with the threshold voltage used as input of the comparator circuit. To be more specific, the threshold input voltage may be determined based on the threshold voltage and the division ratio of the optional voltage divider coupled between the input of the power converter and the comparator circuit.

The feedback circuit may be configured to regulate, in the voltage regulation mode, the output voltage of the power converter towards a target output voltage. The target output voltage may be equal to the threshold input voltage. As an advantage, the output voltage of the power converter may be a smooth continuous function of the input voltage of the power converter. This configuration may be particularly useful if the output voltage of the power converter is used to supply a circuit having requirements for low ripple of the supply voltage. Alternatively, the target output voltage may also be larger or smaller than the threshold input voltage.

The bypass circuit may be coupled between the input of the power converter and a reference potential. The bypass circuit may comprise a current source or a voltage source for generating said predetermined voltage. For example, the bypass circuit may comprise a Zener diode and a current source connected in series between the input of the power converter and a reference potential.

The power converter may be configured to operate, in the bypass mode, the pass device as a closed switch between the input of the power converter and the output of the power converter. The closed switch may have a certain on-resistance. As a result, the output voltage may be a linear function of the input voltage when the power converter is in the bypass mode. In other words, the power converter may be configured to pass the input voltage to the output of the power converter when the power converter is in the bypass mode. In the voltage regulation mode, in contrast, the pass device is operated in a linear region. In the voltage regulation mode, the pass device may be regarded as a VCCS and the output voltage of the power converter may be a function of the drive signal applied to the control terminal of the pass device. To this end, the gate-source voltage of the pass device may be larger than the threshold voltage of the pass device in the voltage regulation mode.

The feedback circuit may be configured to generate, in the voltage regulation mode, the drive signal by comparing the output voltage with a reference voltage. The reference voltage may be associated with the target output voltage. Specifically, the reference voltage may be chosen such that a desired target output voltage is achieved. The feedback circuit may comprise an error amplifier and an inverter circuit. The error amplifier may be configured to generate an error signal by comparing the output voltage with the reference voltage. The inverter circuit may be configured to generate the drive signal based on the error signal. The inverter circuit may comprise a first (diode-connected) transistor coupled between the input of the power converter and an output of the inverter circuit. Further, the inverter circuit may comprise a second transistor coupled between the output of the inverter circuit and a reference potential. The second transistor may be controlled by said error signal.

The error amplifier may comprise a current source, a first transistor, a second transistor, a third transistor, and a fourth transistor. The current source may be coupled between the input of the power converter and a first intermediate node. The first transistor may be coupled between the first intermediate node and a second intermediate node. The second transistor may be coupled between the first intermediate node and an output of the error amplifier. The third transistor may be coupled between the second intermediate node and a reference potential. The fourth transistor may be coupled between the output of the error amplifier and the reference potential. For example, the reference voltage may be applied to a gate of the first transistor. The second transistor may be controlled by a voltage indicative of the output voltage of the power converter. In particular, the second transistor may be coupled to the output voltage of the power converter via a (resistive) voltage divider circuit. The third transistor may be a diode-connected transistor.

The power converter may further comprise a switching circuit configured to couple the bypass circuit or the feedback circuit to the control terminal of the pass device.

Moreover, the power converter may be configured to, in the bypass mode, disable the feedback circuit. The feedback circuit may be powered by the input voltage. To this end, the feedback circuit may be coupled between the input of the power converter and the reference potential. To disable the feedback circuit, the power converter may comprise one or more isolation switches to prevent current flow within the feedback circuit when the power converter is in bypass mode. For example, an isolation switch may be coupled in series with the feedback circuit between the input of the power converter and the reference potential. In this way, by opening the isolation switch, current flow through the feedback circuit may be stopped. As an advantage, the power efficiency of the power converter in bypass mode may be substantially increased.

According to another aspect, a method of operating a power converter is described. The method may comprise steps which correspond to the functional features of the power converter described in the present document. The power converter may convert an input voltage at the input of the power converter into an output voltage at an output of the power converter. The power converter may comprise a pass device, a feedback circuit, and a bypass circuit. The pass device may be coupled between the input of the power converter and the output of the power converter. The method may comprise generating, by the feedback circuit, in a voltage regulation mode, a drive signal for driving a control terminal of the pass device. The method may comprise applying, by a bypass circuit, in a bypass mode, a predetermined voltage to the control terminal of the pass device.

The power converter may comprise a comparator circuit for comparing a voltage indicative of the input voltage with a threshold voltage. The method may comprise selecting between the bypass mode and the voltage regulation mode based on the result of the comparison. The method may comprise switching to the bypass mode if the input voltage falls below a threshold input voltage. The method may comprise switching to the voltage regulation mode if the input voltage exceeds the threshold input voltage.

The method may comprise regulating, by the feedback circuit, in the voltage regulation mode, the output voltage of the power converter towards a target output voltage.

The bypass circuit may be coupled between the input of the power converter and a reference potential. The method may comprise generating said predetermined voltage using a current source or a voltage source of the bypass circuit. The method may comprise operating, in the bypass mode, the pass device as a closed switch between the input of the power converter and the output of the power converter.

The method may comprise generating, by the feedback circuit, in the voltage regulation mode, the drive signal by comparing the output voltage with a reference voltage. The feedback circuit may comprise an error amplifier and an inverter circuit. The method may comprise generating, by the error amplifier, an error signal by comparing the output voltage with the reference voltage. The method may comprise generating, by the inverter circuit, the drive signal based on the error signal. The inverter circuit may comprise a first transistor and a second transistor. The method may comprise coupling the first transistor between the input of the power converter and an output of the inverter circuit. The method may comprise coupling the second transistor between the output of the inverter circuit and a reference potential.

The error amplifier may comprise a current source, a first transistor, a second transistor, a third transistor, and a fourth transistor. The method may comprise coupling the current source between the input of the power converter and a first intermediate node. The method may comprise coupling the first transistor between the first intermediate node and a second intermediate node. The method may comprise coupling the second transistor between the first intermediate node and an output of the error amplifier. The method may comprise coupling the third transistor between the second intermediate node and a reference potential. The method may comprise coupling the fourth transistor between the output of the error amplifier and the reference potential.

The method may comprise coupling, by a switching circuit, the bypass circuit or the feedback circuit to the control terminal of the pass device. The method may comprise disabling the feedback circuit in the bypass mode in order to save power.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which FIGS. 1A, 1B, 1C and 1D show an exemplary power converter and three diagrams illustrating the relation between the input voltage and the output voltage.

DESCRIPTION

Figure 2:
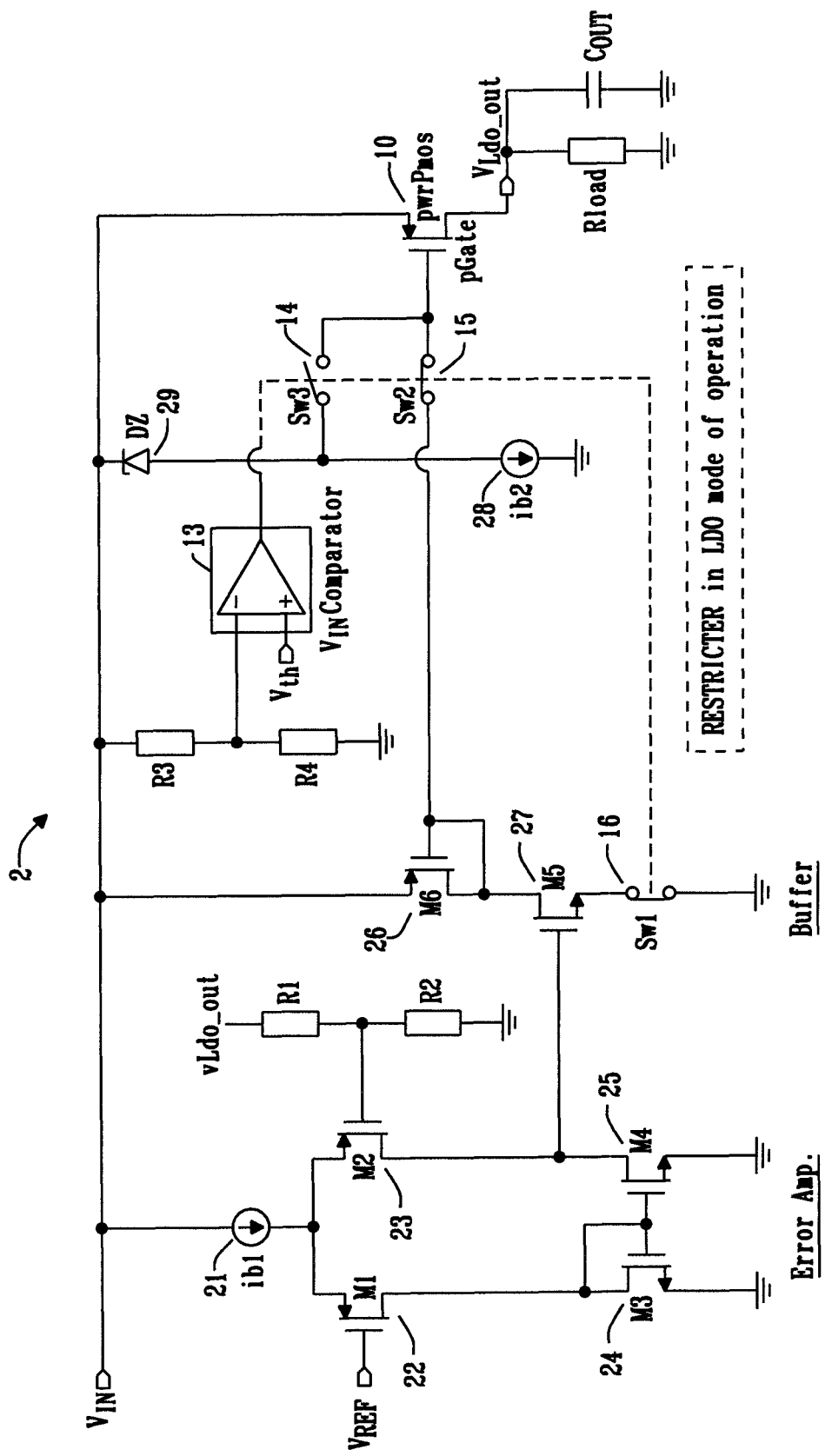
FIG. 2 shows a more detailed circuit diagram of an exemplary power converter.

FIGS. 1A, 1B, 1C and 1D show an exemplary power converter 1 and three diagrams illustrating the relation between the input voltage and the output voltage. The exemplary power converter 1 in FIG. 1A comprises a pass transistor 10 (pass device), a feedback circuit including an LDO control block 11, and a bypass circuit including voltage source 12 and comparator 13. The pass transistor 10 is coupled between the input of the power converter 1 and the output of the power converter. The LDO control block 11 generates, in a voltage regulation mode, a drive signal for driving the gate of pass transistor 10. The voltage source 12 applies, in a bypass mode, a predetermined voltage to the gate of pass transistor 10. In this way, pass transistor 10 is operated as a switch, and the power consumption of the power converter 1 is substantially reduced compared to a situation in which the power converter 1 is in drop-out (i.e. in the voltage regulation mode with a low input voltage). In bypass mode, the power converter 1 is always stable since no feedback loop is active. As another advantage of the bypass mode, the design of the LDO feedback circuit is simplified since stability must be guaranteed in a reduced voltage range (i.e. from the threshold input voltage to $V_{IN\_MAX}$), whereas a conventional LDO needs to be stable in the full voltage range (i.e. from 0V to $V_{IN\_MAX}$).

The power converter 1 further comprises a switching circuit with switches 14 and 15 for connecting either LDO control block 11 or voltage source 12 to the gate of pass transistor 10. Both switches 14 and 15 are controlled based on the output of comparator 13.

FIG. 1C shows an exemplary signal waveform of the input voltage. Depending on the relation between the target output voltage VLDO_TARGET and the threshold input voltage VIN_th, three different behaviors of the output voltage can be observed:

1. In FIG. 1D, VLDO_TARGET<VIN_th: In that case, the output voltage will experience a STEP when the input voltage VIN crosses the threshold input voltage VIN_th. This scenario is depicted in the bottom of FIG. 1D. Main advantage of such a mode of operation is the maximum possible power efficiency because LDO drop-out operation is avoided.

2. In FIG. 1C, VLDO_TARGET=VIN_th: In that case, the output voltage is a smooth, continuous function of the input voltage VIN. This arrangement is of particular use when a circuit at the output of the power converter 1 has requirements for low ripple of supply voltage. This scenario is depicted in the middle diagram 3.

3. When VLDO_TARGET>VIN_th: Again, the output voltage will be a smooth continuous function of the input voltage VIN, as in case 2, but IQ of the regulator may increase substantially. This case may not show any advantage compared to the previous two cases. This scenario is not depicted in FIG. 1B, 1C or 1D.

In general, there are three main classes of power management circuits that can be distinguished: Switch Mode Power Supplies, linear regulators (in particular, regulators with low voltage drop over regulating power device, called LDO) and power switches. For the goal of safety and better power utilization, a new type of power management circuit is derived within this document from the combination of power switch and LDO. The same power device can work as a switch and output voltage regulating device. Thus, the power converter presented in this document has a bypass mode and voltage regulation mode (LDO mode) of operation.

FIG. 2 shows a more detailed circuit diagram of an exemplary power converter 2. In FIG. 2, the LDO control block 10 of FIG. 1 is implemented with the help of current source ib1 21, transistors M1-M6 22, 23, 24, 25, 26, 27, and resistor divider R1, R2. In particular, current source ib1 and transistors M1-M4 form an error amplifier for comparing a scaled version of the output voltage vLDO-out with the reference voltage $V_{REF}$, and for amplifying the difference between the latter signals. Transistors M5 and M6 form a buffer (inverter circuit). Comparator 13, Zener Diode 29 and current source 28 form the bypass circuit which applies a constant voltage to the gate of pass device 10 if the comparator 13 decides that the power converter 2 is in the bypass mode. The breakdown voltage (e.g. 5V) of the Zener diode may be smaller than the breakdown voltage of the gate-oxid of the pass device 10 (e.g. 5.5V). In FIG. 2, the switching circuitry comprises a switch 16 in addition to the two switches 14 and 14 which are displayed in FIG. 1. Switch 16 may be regarded as isolation switch for stopping current flow through the buffer. In addition, power converter 2 may comprise an additional isolation switch (not shown) for disabling the error amplifier. Such an additional isolation switch may be coupled e.g. in series to the current source ib1.

The comparator 13 defines the mode of operation of the power converter 2 by opening and closing switches Sw1-Sw3. When VIN>VIN_th, comparator 13 closes Sw1-Sw2 and opens Sw3 and thereby allows negative feedback, from the output, to stabilize the output voltage vLdo_out and limits the output voltage to a safe level of VOUT TARGET (i.e. the target output voltage). When VIN<VIN_th, switch Sw3 is closed and Sw1-Sw2 are opened. In that case, the gate-source voltage VGS of pass device pwrPmos is constant and defined by breakdown of Zener diode DZ or the input voltage VIN (whatever is smaller).

The example schematic in FIG. 2 illustrates increased current consumption in case VIN gets close to VLDO_TARGET. If we assume that VIN is getting low, the drop over pwrPmos might become lower and lower such that the output voltage stays stable and equal to VLDO_TARGET. This may be achieved by increasing current through the diode connected M6. When VIN gets equal or lower than VLDO_TARGET, than feedback loop, in an attempt to keep the output voltage at VLDO_TARGET, will pull pGate as low as possible, causing significant increase of the current in the branch comprising Sw1, M5, M6. In this condition (VIN<VLDO_TARGET), current trough M6 is maximum and independent from output load. This maximum current is defined by the size of M6, which in turn, is defined by the requirements for stable operation of the LDO. Entering the bypass mode when VIN<VLDO_TARGET will solve this high IQ issue, because Ib2 can be very small. Finally, it should be mentioned that the target output voltage VLDO_TARGET and the threshold input voltage (VIN_th) may be defined independently to optimize the performance of power converter 2.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to convert an input voltage at the input of the power converter into an output voltage at an output of the power converter, wherein the power converter comprises
   a pass device coupled between the input of the power converter and the output of the power converter,
   a feedback circuit configured to generate, in a voltage regulation mode, a drive signal for driving a control terminal of the pass device,
   a bypass circuit configured to apply, in a bypass mode, a predetermined voltage to the control terminal of the pass device
   a comparator circuit for comparing a voltage indicative of the input voltage with a threshold voltage,
   wherein the power converter is configured to:
      select between the bypass mode and the voltage regulation mode based on the result of the comparison;
      switch to the bypass mode if the input voltage falls below a threshold input voltage; and
      switch to the voltage regulation mode if the input voltage exceeds the threshold input voltage.

2. The power converter according to claim 1, wherein the feedback circuit is configured to regulate, in the voltage regulation mode, the output voltage of the power converter towards a target output voltage.

3. The power converter according to claim 1, wherein the bypass circuit is coupled between the input of the power converter and a reference potential, and wherein the bypass circuit comprises a current source or a voltage source for generating said predetermined voltage.

4. The power converter according to claim 1, wherein the power converter is configured to operate, in the bypass mode, the pass device as a closed switch between the input of the power converter and the output of the power converter.

5. The power converter according to claim 1, further comprising a switching circuit configured to couple the bypass circuit or the feedback circuit to the control terminal of the pass device.

6. The power converter according to claim 1, wherein the power converter is configured to, in the bypass mode, disable the feedback circuit.

7. A power converter configured to convert an input voltage at the input of the power converter into an output voltage at an output of the power converter, wherein the power converter comprises
   a pass device coupled between the input of the power converter and the output of the power converter,
   a feedback circuit configured to generate, in a voltage regulation mode, a drive signal for driving a control terminal of the pass device,
   a bypass circuit configured to apply, in a bypass mode, a predetermined voltage to the control terminal of the pass device,
   wherein the feedback circuit is configured to generate, in the voltage regulation mode, the drive signal by comparing output voltage reference voltage, and wherein the feedback circuit comprises an error amplifier and an inverter circuit, wherein
      the error amplifier is configured to generate an error signal by comparing the output voltage with the reference voltage, and
      the inverter circuit is configured to generate the drive signal based on the error signal.

8. The power converter according to claim 7, wherein the inverter circuit comprises a first transistor coupled between the input of the power converter and an output of the inverter circuit, and a second transistor coupled between the output of the inverter circuit and a reference potential.

9. The power converter according to claim 7, wherein the error amplifier comprises a current source, a first transistor, a second transistor, a third transistor, and a fourth transistor, wherein
   the current source is coupled between the input of the power converter and a first intermediate node,
   the first transistor is coupled between the first intermediate node and a second intermediate node,
   the second transistor is coupled between the first intermediate node and an output of the error amplifier,
   the third transistor is coupled between the second intermediate node and a reference potential, and
   the fourth transistor is coupled between the output of the error amplifier and the reference potential.

10. A method of operating a power converter, wherein the power converter converts an input voltage at the input of the power converter into an output voltage at an output of the power converter, wherein the power converter comprises a pass device, a feedback circuit, a bypass circuit, and comprises a comparator circuit for comparing a voltage indicative of the input voltage with a threshold voltage, wherein the pass device is coupled between the input of the power converter and the output of the power converter, and wherein the method comprises
   generating, by the feedback circuit, in a voltage regulation mode, a drive signal for driving a control terminal of the pass device,
   applying, by a bypass circuit, in a bypass mode, a predetermined voltage to the control terminal of the pass device,
   selecting between the bypass mode and the voltage regulation mode based on the result of the comparison,
   switching to the bypass mode if the input voltage falls below a threshold input voltage, and
   switching to the voltage regulation mode if the input voltage exceeds the threshold input voltage.

11. The method according to claim 10, further comprising regulating, by the feedback circuit, in the voltage regulation mode, the output voltage of the power converter towards a target output voltage.

12. The method according to claim 10, wherein the bypass circuit is coupled between the input of the power converter and a reference potential, and wherein the method comprises
generating said predetermined voltage using a current source or a voltage source of the bypass circuit.

13. The method according to claim 10, further comprising operating, in the bypass mode, the pass device as a closed switch between the input of the power converter and the output of the power converter.

14. The method according to claim 10, further comprising coupling, by a switching circuit, the bypass circuit or the feedback circuit to the control terminal of the pass device.

15. The method according to claim 10, further comprising disabling the feedback circuit in the bypass mode.

16. A method of operating a power converter, wherein the power converter converts an input voltage at the input of the power converter into an output voltage at an output of the power converter, wherein the power converter comprises a pass device, a feedback circuit, and a bypass circuit, wherein the pass device is coupled between the input of the power converter and the output of the power converter, and wherein the method comprises;
generating, by the feedback circuit, in a voltage regulation mode, a drive signal for driving a control terminal of the pass device,
generating, by the feedback circuit, in the voltage regulation mode, the drive signal by comparing the output voltage with a reference voltage, and
applying, by a bypass circuit, in a bypass mode, a predetermined voltage to the control terminal of the pass device,
wherein the feedback circuit comprises an error amplifier and an inverter circuit, and
wherein the method comprises
generating, by the error amplifier, an error signal by comparing the output voltage with the reference voltage, and
generating, by the inverter circuit, the drive signal based on the error signal.

17. The method according to claim 16, wherein the inverter circuit comprises a first transistor and a second transistor, wherein the method comprises
coupling the first transistor between the input of the power converter and an output of the inverter circuit, and
coupling the second transistor between the output of the inverter circuit and a reference potential.

18. The method according to claim 16, wherein the error amplifier comprises a current source, a first transistor, a second transistor, a third transistor, and a fourth transistor, and wherein the method comprises
coupling the current source between the input of the power converter and a first intermediate node,
coupling the first transistor between the first intermediate node and a second intermediate node,
coupling the second transistor between the first intermediate node and an output of the error amplifier,
coupling the third transistor between the second intermediate node and a reference potential, and
coupling the fourth transistor between the output of the error amplifier and the reference potential.

* * * * *